Jan. 25, 1955     H. W. MULCAHY     2,700,477
COMBINED RUBBER AND FRICTION SHOCK ABSORBING
MECHANISM FOR RAILWAY DRAFT RIGGINGS
Filed Feb. 9, 1952     2 Sheets-Sheet 1
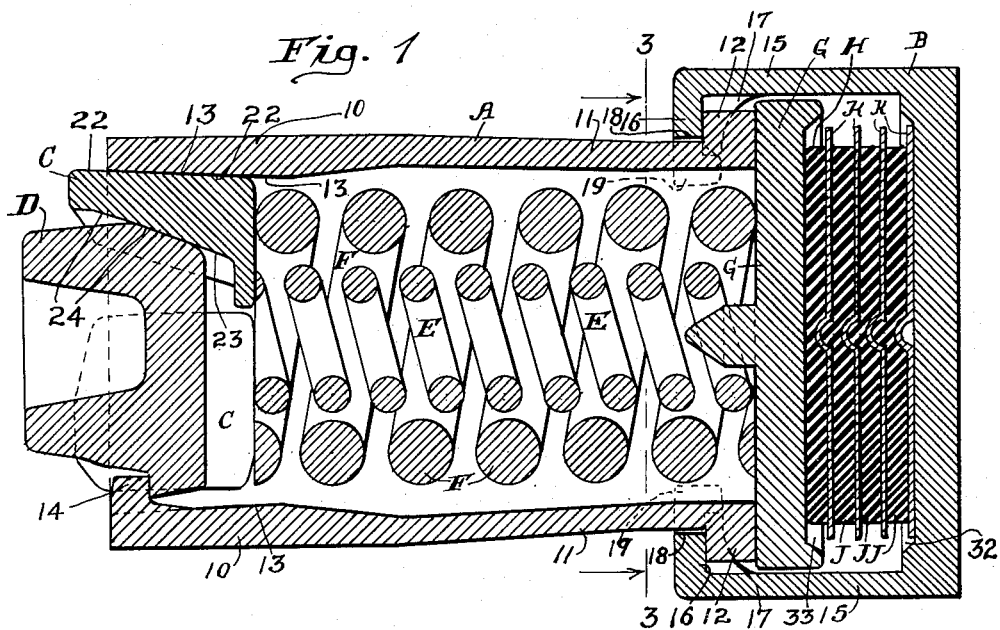
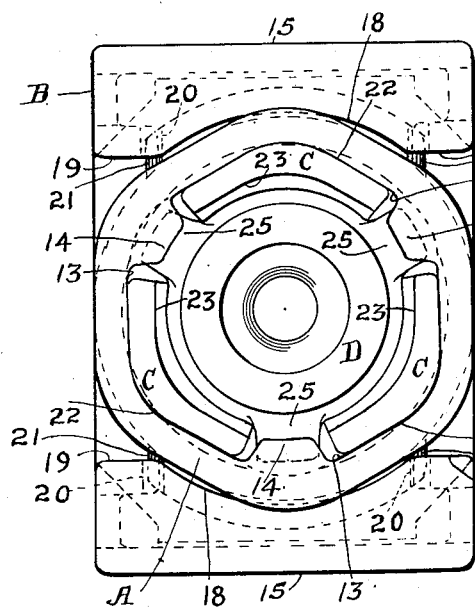
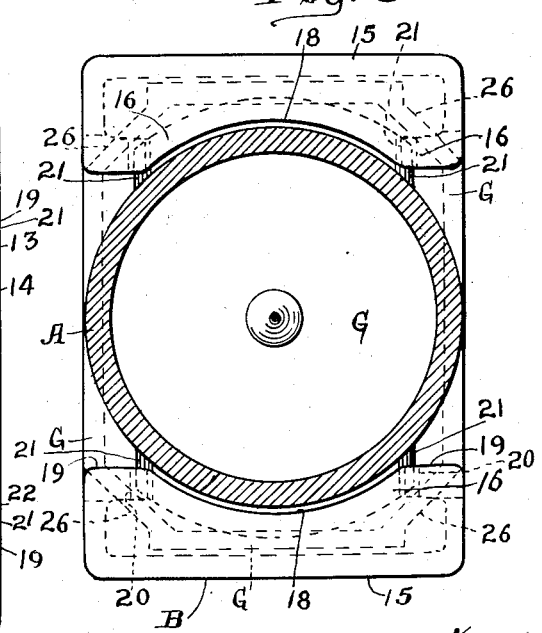
Inventor:
Harry W. Mulcahy.
By Henry Fuchs
Atty.

Jan. 25, 1955 H. W. MULCAHY 2,700,477
COMBINED RUBBER AND FRICTION SHOCK ABSORBING
MECHANISM FOR RAILWAY DRAFT RIGGINGS
Filed Feb. 9, 1952 2 Sheets-Sheet 2
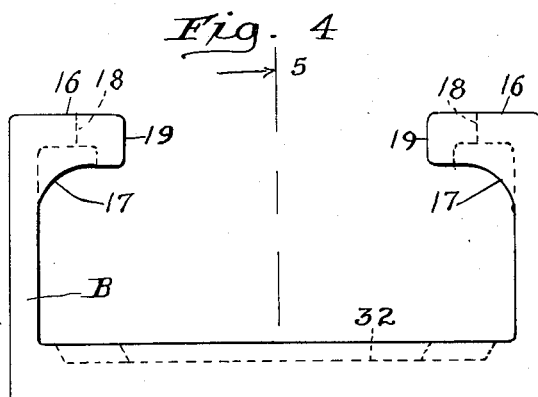
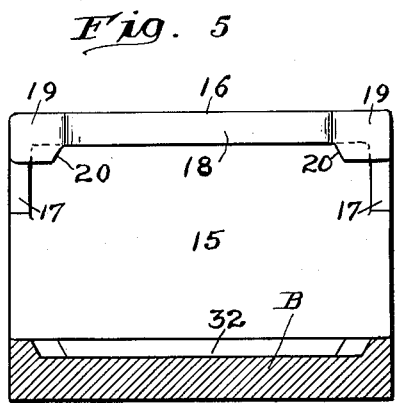
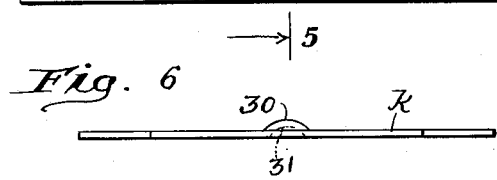
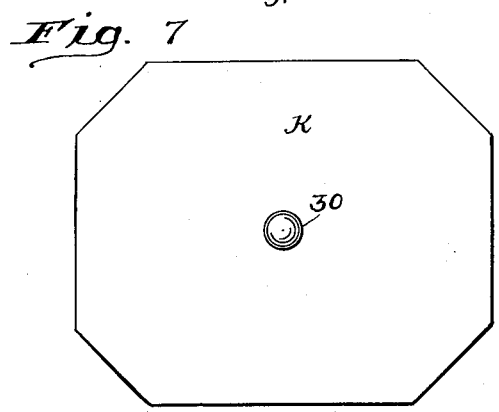
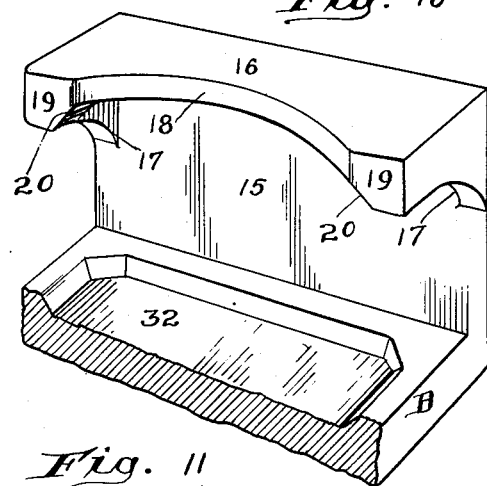
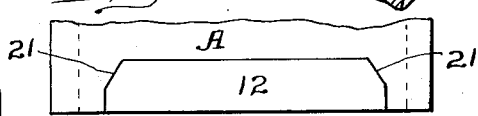
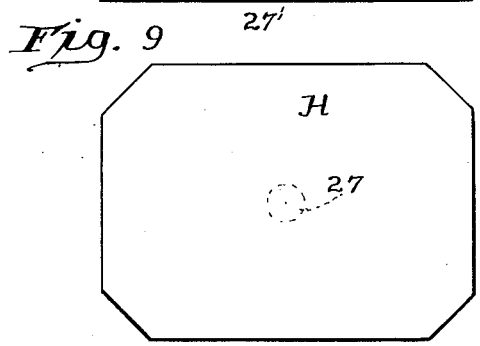
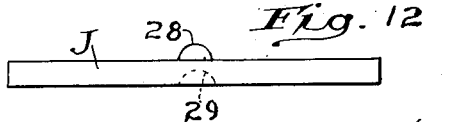
Inventor:
Harry W. Mulcahy.
By Henry Fuchs
Atty.

2,700,477

COMBINED RUBBER AND FRICTION SHOCK ABSORBING MECHANISM FOR RAILWAY DRAFT RIGGINGS

Harry W. Mulcahy, Chicago, Ill., assignor to W. H. Miner, Inc., Chicago, Ill., a corporation of Delaware Application February 9, 1952, Serial No. 270,815

2 Claims. (Cl. 213—45)

This invention relates to improvements in shock absorbing mechanisms for railway draft riggings.

One object of the invention is to provide a shock absorbing mechanism comprising a friction casing, a friction clutch at the front end of the casing having sliding frictional engagement with the interior walls of said casing, a main spring resistance within the casing yieldingly opposing inward movement of the clutch, a rear follower at the rear end of the casing, movable lengthwise with respect to the latter, and a rubber cushioning unit interposed between said last named end of the casing and the follower to cushion relative movements of said casing and follower.

A more specific object of the invention is to provide a mechanism as set forth in the preceding paragraph, wherein the casing is open at the rear end, and an auxiliary follower on which the main spring bears is interposed between the rubber cushioning unit and said open rear end of the casing, whereby the main spring resistance balances the action of the rubber cushioning unit and any set taken by the material of the rubber cushioning unit in service is compensated for by expansion of the main spring resistance, thereby eliminating slack, in the form of looseness or play between the rubber cushioning unit and casing, which would otherwise occur.

A further object of the invention is to provide in the mechanism as hereinbefore set forth, simple and efficient means for connecting the rear follower to the casing in such a manner as to limit outward movement of said follower with respect to the casing.

Other objects of the invention will more clearly appear from the description and claims hereinafter following.

In the accompanying drawings forming a part of this specification, Figure 1 is a horizontal, longitudinal sectional view of my improved combined friction and rubber shock absorbing mechanism. Figure 2 is a front elevational view, looking from left to right in Figure 1. Figure 3 is a transverse, vertical sectional view, corresponding substantially to the line 3—3 of Figure 1. Figure 4 is a plan view of the rear follower shown in Figure 1. Figure 5 is a transverse sectional view, corresponding substantially to the line 5—5 of Figure 4. Figure 6 is an edge elevational view of one of the spacing plates or separators of my improved mechanism. Figure 7 is a top plan view of Figure 6. Figure 8 is an edge elevational view of the rubber mat or pad employed at the left hand end of the rubber cushioning unit shown in Figure 1. Figure 9 is a top plan view of Figure 8. Figure 10 is a broken, detail perspective view of the rear follower of my improved mechanism. Figure 11 is a broken view in side elevation, of the rear end portion of the casing of my improved mechanism. Figure 12 is an edge elevational view of one of the rubber pads employed in my improved rubber cushioning unit, which is disposed in said unit rearwardly of the pad shown in Figures 8 and 9.

My improved combined friction and rubber shock absorbing mechanism comprises broadly a friction casing A, a rear follower member B, a set of three friction shoes C—C—C slidable in the casing, a wedge block D in wedging engagement with the shoes, inner and outer coil springs E and F together forming the main spring resistance of the mechanism, an auxiliary follower plate G bearing on the rear end of the casing, a series of rubber mats H, J, J, J, and a series of spacing plates or separators K—K—K—K alternated with the rubber mats or pads of the rubber shock absorbing unit.

The friction casing A is in the form of a hollow, tubular member, open at its front and rear ends. The front end portion of the casing is of hexagonal, transverse cross section and provides the friction shell portion of the casing, which shell portion is indicated by 10. The portion of the casing A, rearwardly of the friction shell portion 10, is of cylindrical cross section and provides a spring cage member 11. The top and bottom sides of the casing, as seen in Figures 1, 2, and 3, at the open rear end thereof, are provided with elongated, transversely disposed, outwardly projecting, arcuate ribs or flanges or lugs 12—12 forming stops for the rear follower member B, as hereinafter described. The hexagonal friction shell portion 10 of the casing A presents three, interior, rearwardly converging friction surfaces 13—13—13, which are of V-shaped, transverse cross section. At the outer end, the friction shell portion of the casing is provided with three inturned stop lugs 14—14—14, which are alternated with the friction surfaces of said shell portion.

The rear follower B is in the form of a relatively thick plate, having forwardly projecting top and bottom, flat, platelike arms 15—15, overlapping the rear end of the casing A and provided with inturned flanges 16—16 at their front ends engaged in front of the stop shoulders provided by the flanges 12—12 of the casing A. Each flange 16 is reinforced by side webs 17—17 extending from the corresponding platelike arm 15.

The mid portions of the flanges 16—16 are cut out, as indicated at 18—18, to fit the outside curvature of the spring cage member 11 of the casing A. At opposite sides of the flanges 16—16, each arm 15 of the follower member B, beyond the cut out portion 18 thereof, is provided with stop projections or lugs 19—19, presenting beveled, or transverely inclined, stop faces 20—20, which converge toward each other. The stop faces 20—20 engage with similar inclined stop faces 21—21 provided at opposite end portions of the corresponding flange 12 of the casing A to lock the follower member B against rotation with respect to the casing.

The friction shoes C, which are three in number, are telescoped within the casing A and are provided with longitudinally extending, V-shaped friction surfaces 22 in sliding engagement with the V-shaped friction surfaces 13 of the casing A. Each shoe C has a V-shaped wedge face 23 on its inner side.

The wedge block D has three V-shaped wedge faces 24—24—24 at its inner end arranged symmetrically about the central longitudinal axis of the casing A and engaging, respectively, the wedge faces 23—23—23 of the three shoes C—C—C. The wedge block D is further provided with three radially outwardly extending stop lugs 25—25—25, which extend between adjacent shoes, and are engaged in back of the stop lugs 14—14—14 on the casing A to limit outward movement of the wedge block D and thus hold the parts of the friction shock absorbing mechanism assembled.

The springs E and F are disposed within the casing A and together form the main spring resistance of the mechanism. Each of these springs is in the form of a helical coil, having its opposite ends bearing on the inner ends of the shoes C and the auxiliary follower plate G, respectively.

The auxiliary follower plate G, which is of substantially rectangular outline, has the corners thereof cut away, as indicated at 26, to facilitate assembling the same with the rear follower B. This auxiliary follower plate is disposed between the arms 15—15 of the rear follower member B and bears on the open rear end portion of the casing A.

The rubber mats or pads H, J, J, J and the spacing plates K, K, K, K, which together form a cushioning unit, are disposed between the plate section of the rear follower B and the auxiliary follower plate G, and are embraced by the arms 15—15 of said follower member B, the spacing plates K, K, K, K being alternated with the rubber mats.

The rubber mats H, J, J, J are preferably of rectangular outline, but of smaller size than the auxiliary follower plate G. The rubber mat H is disposed at the forward end of the rubber cushioning unit and bears on the auxiliary follower plate G. The front side, that is, the side of the mat H which bears on the auxiliary follower plate G, presents a substantially flat, uninterrupted surface, as shown, while the rear side thereof, which is also flat, is provided with a depression or seat 27 at its center. The mats J, J, J also present substantially flat, front and rear surfaces, as shown. Each mat J is provided with a centering projection 28 at its front side and a depression or seat 29 at its rear side, which projection and seat are located substantially centrally of the mat. The depression or seat 29 of each pad J is identical with the depression or seat 27 of the mat H.

The spacing plates K are of substantially rectangular shape and of greater size than the mats H, J, J, J. The spacing plates thus extend beyond the edges of the mats and thereby protect the latter against damage. Each plate K is provided with a centering member at the central portion thereof, which is formed by pressing the metal of the plate outwardly, thereby providing a projection 30 at the front side of the plate and a seat 31 at the rear side thereof.

In the assembled condition of the mechanism, the centering projections of the plates K—K—K—K are engaged in the seats 27, 29, 29, 29 of the mats H, J, J, J, respectively, with the projections 28 of the mats J, J, J engaged within the seats 31—31—31 of the adjacent plates. As shown in Figure 1, the front side of the plate portion of the follower member B is provided with a depression 32 forming a seat which accommodates the rearmost spacing plate K of the rubber cushioning unit, and the rear side of the auxiliary follower plate G is provided with a similar depression 33, forming a seat which accommodates the mat H. In the completely assembled condition of the mechanism, the rubber cushioning unit comprising the mats H, J, J, J, and the spacing plates K, K, K, K, is held under the predetermined amount of initial compression between the rear follower member B and the auxiliary follower plate G.

In assembling the mechanism, the rear follower is placed on a suitable horizontal support with the rear side of the plate section thereof resting flatly on said support, so that the arms 15—15 are in upstanding position. Preferably, the entire assembling operation is performed while the rear follower member B is in this standing position. The cushioning unit, comprising the series of mats H, J, J, J alternated with the spacing plates K, K, K, K is first placed within the follower member B between the arms 15—15 thereof, in centered position, seated in the depression 32 on the forward side of the plate section of said follower member. The auxiliary follower plate G is then placed within the follower member B in seated position on the mat H of the rubber cushioning unit. The casing A, in upright position, with the outer coil spring F arranged therein, is then placed on top of the auxiliary follower plate G. In placing the casing A on the follower plate G, the casing is turned so that the flanges 12—12 thereof register with the opening between the opposed flanges 16—16 of the two arms 15—15 of the follower member B, whereby the flanges 12—12 will pass freely between the flanges 16—16 and be positioned to engage in back of said flanges 16—16 when the casing A is rotated through an angle of 90 degrees about its longitudinal axis. After the casing A has been placed in this position, the rubber cushioning unit is compressed by depressing the auxiliary follower plate G, with the casing A resting thereon, until the flanges 12—12 of the casing pass below the level of the flanges 16—16 of the rear follower member B. To depress the auxiliary follower plate G, a tool in the form of an upright plunger is preferably employed, the same being entered through the open front end of the casing A and passed through the outer coil spring F and engaged with the auxiliary follower plate. After the flanges 12—12 of the casing A have been brought below the level of the flanges 16—16 of the rear follower member B, by depressing the auxiliary follower plate G, the casing A is rotated through an arm of 90 degrees, bringing the flanges 12—12 in back of the flanges 16—16. With the casing A thus positioned, the pressure is withdrawn from the auxiliary follower plate G, permitting the rubber cushioning unit to expand and project the auxiliary follower plate G and the casing A upwardly, bringing the flanges 12—12 into engagement with the flanges 16—16 of the rear follower member B. In this operation, the inclined or bevel-faced lugs 19—19 of the follower member B serve to guide the parts to accurately position the flanges 12—12 and 16—16 with respect to each other. In this connection it is pointed out that the lugs 19—19 also assist in keeping the casing A and the rear follower member B properly aligned during operation of the mechanism in service. After the follower member B has thus been connected to the casing A, the inner coil spring E, shoes C—C—C, and the wedge R are applied to the casing A by entering all of these parts through the open front end of the casing, the lugs 25—25—25 of the wedge block D being engaged in back of the lugs 14—14—14 of the casing A while the shoes C—C—C are held in inwardly displaced position by any suitable tool engaged with said shoes to place the springs E and F under compression. As hereinbefore brought out, the outer coil spring F is assembled with the casing A before connecting the follower member B to said casing. In placing the outer coil spring F within the casing, the former is entered through the open unobstructed rear end of the latter, thereby permitting a maximum diameter coil spring being used, with resulting increased capacity of the mechanism, which would not be possible if the casing were closed at its rear end and the outer coil spring F had therefore to be entered through the front end of the casing, the interior opening of which is restricted in size by the inwardly projecting stop lugs 14—14—14.

The operation of my improved shock absorbing mechanism is as follows: During relative movement of the front follower of the usual draft rigging of a railway car and the friction casing A toward each other, the wedge block D is forced inwardly of the casing A, thereby wedging the shoes C—C—C apart and sliding the same inwardly on the friction surfaces of the casing, against the resistance of the springs E and F. During this action, pressure is transmitted to the rubber cushioning unit, comprising the mats H, J, J, J, through the auxiliary follower plate G, thereby also effecting compression of this rubber unit.

I claim:

1. In a combined rubber and friction draft gear, the combination with a friction casing open at its rear end; of friction shoes slidingly telescoped within the front end of said casing; a wedge block in wedging engagement with the shoes; a rear follower operatively connected to the rear end of the casing for restricted movement lengthwise of the mechanism with respect to said casing; an auxiliary follower plate bearing on the open rear end of said casing; spring means within the casing bearing on said auxiliary follower plate and yieldingly opposing inward movement of said shoes; a rubber cushioning unit interposed between and bearing, respectively, on said auxiliary follower plate and the rear follower, said unit comprising a plurality of rubber mats and a plurality of flat spacing members alternated with said rubber mats, said spacing members having centrally located centering projections thereon, and said mats having central seats in which said projections are engaged.

2. In a combined rubber and friction draft gear, the combination with a friction casing open at its rear end; of friction shoes slidingly telescoped within the front end of said casing; a wedge block in wedging engagement with the shoes; a rear follower operatively connected to the rear end of the casing for restricted movement lengthwise of the mechanism with respect to said casing; an auxiliary follower plate bearing on the open rear end of said casing; spring means within the casing bearing on said auxiliary follower plate and yieldingly opposing inward movement of said shoes; a rubber cushioning unit interposed between and bearing, respectively, on said auxiliary follower plate and the rear follower, said unit comprising a plurality of rubber mats and a plurality of flat spacing members alternated with said rubber mats, each of said spacing members having a centrally located centering projection on one side and an aligned centering seat on the other side thereof, and said mats each having a central centering projection on one side thereof engaged within the seat of the adjacent spacing member, and a central seat on the other side thereof within which the projection of the next adjacent spacing member is engaged.

References Cited in the file of this patent

UNITED STATES PATENTS

| | | | |
|---|---|---|---|
| 1,364,511 | O'Connor | Jan. 4, | 1921 |
| 1,684,510 | O'Connor | Sept. 18, | 1928 |
| 2,448,138 | Dath | Aug. 31, | 1948 |
| 2,458,572 | Dentler | Jan. 11, | 1949 |
| 2,491,128 | Nelson | Dec. 13, | 1949 |
| 2,553,635 | Dath | May 22, | 1951 |
| 2,553,636 | Dath | May 22, | 1951 |